United States Patent [19]

Wesseler

[11] 4,004,856
[45] Jan. 25, 1977

[54] SCAFFOLD SUBASSEMBLY
[75] Inventor: Gerhard Wesseler, Vreden, Germany
[73] Assignee: Dula-Werke Dustmann & Co., Dortmund-Hombruch, Germany
[22] Filed: Mar. 19, 1975
[21] Appl. No.: 559,935
[30] Foreign Application Priority Data
Mar. 29, 1974 Germany .................... 2415208
[52] U.S. Cl. .............................. 403/186; 403/252
[51] Int. Cl.² ......................................... F16B 7/00
[58] Field of Search ............ 403/252, 256, 257, 49, 403/186; 211/177, 176
[56] References Cited
UNITED STATES PATENTS
3,580,620  5/1971  Offenbroich ...................... 403/252

FOREIGN PATENTS OR APPLICATIONS
339,584  7/1921  Germany ........................ 403/256
1,163,532  9/1969  United Kingdom ............... 403/49

Primary Examiner—Andrew V. Kundrat
Attorney, Agent, or Firm—Burgess, Dinklage & Sprung

[57] ABSTRACT

A scaffold which can be readily assembled and disassembled. The cross numbers are outfitted with retractable hooks for, when extended, engagement with slots in the uprights. With the hooks extended, wedges secure them in tight engagement with the slots. The hooks are unremovably mounted on the cross members, and the wedges are also unremovably mounted.

7 Claims, 5 Drawing Figures

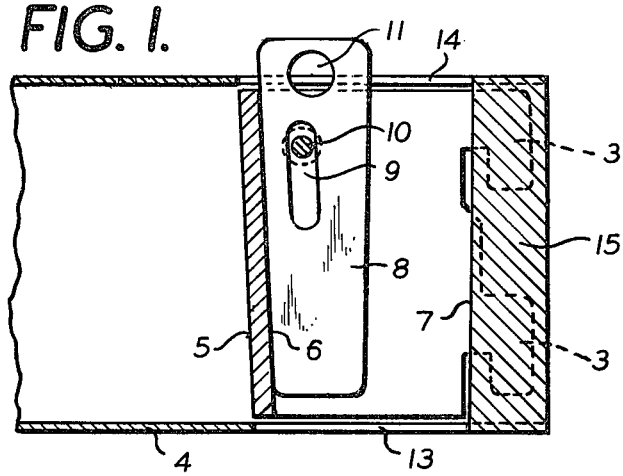
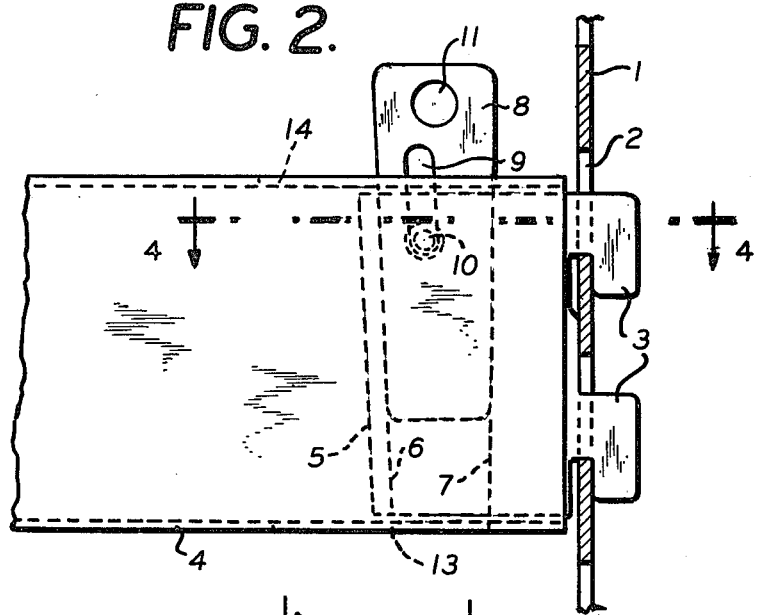
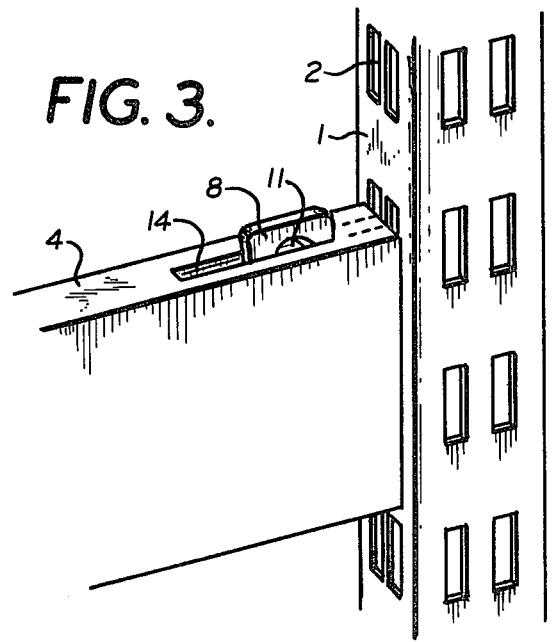

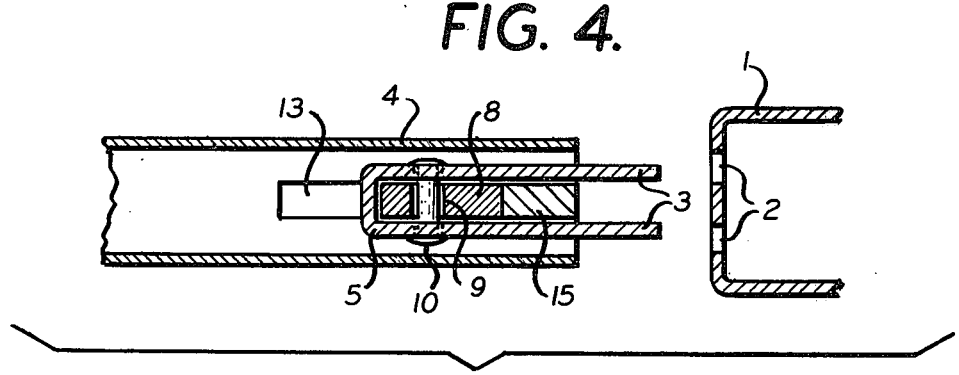
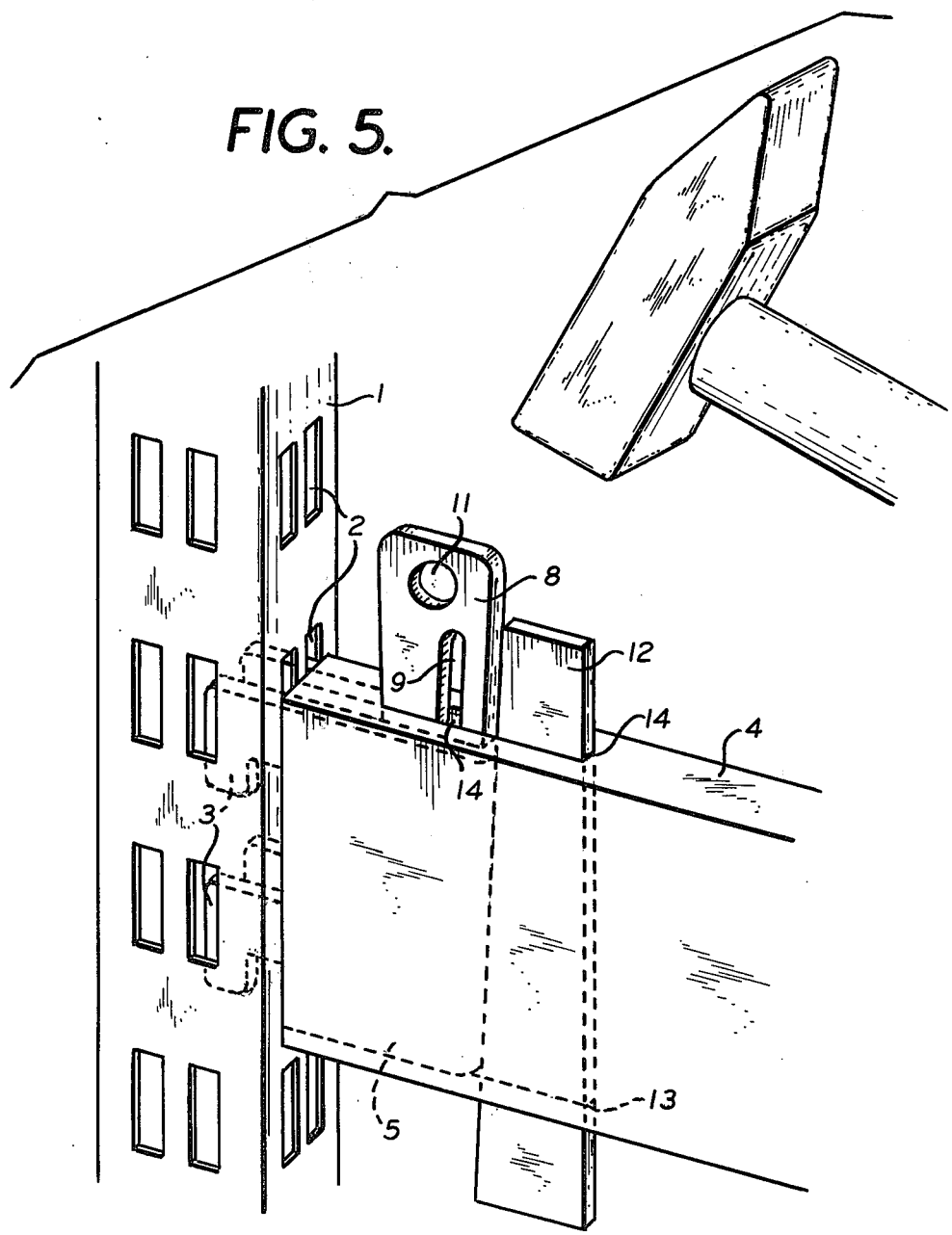

SCAFFOLD SUBASSEMBLY

BACKGROUND

The invention relates to a component assembly for establishing a connection between a shelving upright provided with slots, and a cross member provided with hooks for insertion into said slots and with wedge members which tightly fasten these parts to one another.

In a known design, loose hooks or hooks separate from the cross member that is to be joined to the upright are provided with a projection in which a slot slanting towards the upright is provided, into which slot a pin affixed to the cross member can be inserted thereby clamping the cross member against the upright. Aside from the fact that this design requires several loose parts, thereby complicating assembly and disassembly, it has been found especially that, after repeated assembly and disassembly of the parts, which frequently occurs when such connecting means are used in fair exhibits or the like, a tight joining of the parts is no longer assured; this is to be attributed to the fact that the tightening forces are exerted through a point contact between the parts so that, after repeated joining, play can develop which can cause the connection to be loosened by vibration.

The object of the invention is to find a solution which will permit not only an easy and rapid assembly and disassembly, but will also assure an equally tight connection after frequently repeated assembly and disassembly.

In a component assembly of the initially described kind, this problem is solved in accordance with the invention in that the hooks in the cross member are held in a longitudinally displaceable manner and can be drawn into the cross member so as to tighten same against the upright by means of a wedge held on the cross member. This construction affords a simple system of assembly, because all of the necessary connecting parts are held on the cross member, and the wedge that serves for tightening assures a tight connection even after frequent assembly and disassembly.

A very simple and advantageous construction is achieved if the hooks are combined with a pocket extending within the cross member and accommodating a wedge which can be driven substantially perpendicularly to the cross member, downwardly into the latter, and cooperates with corresponding ramp surfaces on the cross member and on the pocket.

The wedge can be provided with a slot through which a pin affixed to the pocket passes, so as to prevent the loss of the wedge.

Furthermore, the wedge may be provided at its wider end with an opening which will extend partially above the edge of the cross member after the connection has been tightened. To loosen the wedge, a tapered tool can then be driven into this opening thereby lifting the wedge out of wedging engagement with the cross member, or extracting the wedge from the cross member.

In order further to facilitate assembly when the connections are difficult to reach, it is recommendable to use an auxiliary wedge which can be inserted between the pocket associated with the hooks and the end of the slot provided in the cross member for the guidance of the wedge, for the purpose of extending the hooks from the end of the cross member and holding them in their fully extended position such that the cross member can be manipulated with one hand to insert the hooks into the correct slots in the upright without having to use the other hand to hold the hooks in their outwardly extended position.

It is desirable in this case to allow the auxiliary wedge inserted through a lower guiding slot in the cross member to extend through the cross member and project slightly above an upper guiding slot in the cross member. After the hooks have been inserted into the slots in the upright, it will be necessary only to knock the auxiliary wedge out with a light blow from a hammer or the like, and then, with another hammer stroke in the same direction, the main wedge, which is substantially parallel to the auxiliary wedge, can be driven in tightly.

The invention will be further explained with the aid of the drawing, by way of example. In the drawing, FIG. 1 is a cross-sectional view of a component assembly of the invention showing the hooks fully engaged with the cross member, FIG. 2 is a view in phantom of the same component assembly as in FIG. 1 with the hooks fully extended and inserted into the slots provided in the upright to receive them, FIG. 3 is a perspective view of the assembly with the wedge tightened, FIG. 4 is a cross-sectional top plan view taken along line 4—4 of FIG. 2, and FIG. 5 is a perspective view of the same assembly with the auxiliary wedge in place to permit manipulation with one hand.

In a shelving upright 1 of a conventional kind, vertical slots 2 are formed, into which the hooks 3 of a cross member 4 can be inserted.

The hooks 3 are combined with a pocket 5 which is displaceable and guided parallel to the cross member 4. The pocket has a slightly inclined rear inner ramp surface 6, and on the cross member 4 there is likewise provided a slightly inclined ramp surface 7 opposite the ramp surface 6, the construction being such that the ramp surface 7 is provided on a ramp member 15 which is affixed to the cross member 4 and is straddled by the pair of hooks 3 (see FIG. 4).

Between the ramp surfaces 6 and 7 there is disposed a wedge 8 having divergent edge surfaces corresponding to the ramp surfaces 6 and 7 and secured against loss by means of a slot 9 and a pin 10 affixed to the pocket 5 and passing through said slot. Also, at the wider end of the wedge there is formed a circular aperture 11 which is so placed that, when the wedge is in the tightened state as in FIG. 3, a small portion of this aperture 11 extends above the upper edge of the cross member 4 such that, when a tapered tool is driven into this projecting portion of aperture 11, the wedge 8 will be again released from the position shown in FIG. 3.

In the method of assembly represented in FIG. 1 to FIG. 3, in which a cross member is to be fastened between fixed shelving uprights, the hooks 3 are first fully withdrawn into the cross member 4, this being accomplished by pulling the pocket 5 back into the cross member by means of the wedge 8. When the cross member is in the correct position between the uprights, then the hooks 3 are extended fully through the slots 2 in the upright 1 and lowered, whereupon the wedge 8 is tightened by a hammer blow, thereby rendering the connection so tight that no unintentional release can occur due to vibration and shock or the like, because if the angle of inclination of the ramp surfaces is sufficiently low the wedge can be firmly seated with a very low tightening force.

In FIG. 5 the hooks 3 of the cross member 4 are shown locked in the fully extended position by means of an auxiliary wedge 12 which is inserted into the cross member from underneath through a lower wedge guiding slot 13 such that the auxiliary wedge extends slightly above an upper wedge guiding slot 14 in the cross member.

In the case of connections which are difficult to reach, such as for example at points which can be reached with only one outstretched arm by a person standing on a ladder, this locking of the hooks 3 in the fully extended position makes it possible for the cross member to be placed, in the position shown in FIG. 5, into a shelving upright and held there by its fully extended hooks, particularly when the first end of a cross member is being inserted into an upright, or in cases in which the spacing between two uprights is not so tight that the cross member can be brought into position only with its hooks retracted.

The embodiment described can, of course, be modified in many ways without departing from the basic idea of the invention. It can be seen, for example, that only one of the two ramp surfaces provided, one on the pocket and the other on the cross member, needs to be an inclined surface, while the other could be at right angles with the cross member. Also, the lower guiding slot in the cross member could be completely dispensed with and the hooks together with the pocket could be locked in the fully extended position by means of a wedge inserted into the upper guiding slot of the cross member, but in this case the removal of this auxiliary wedge could not be accomplished in the especially advantageous manner described above.

SUMMARY

Thus, the invention provides a cross member for a scaffold formed by cross members, which have end hooks, and uprights having slots in which the hooks engage to join the cross members and uprights together, and wedges securing the cross members and uprights in place. According to the invention, the cross member has a hook which is secured to the cross member in an unremovable manner and so that it is longitudinally shiftable on the cross member between a retracted position permitting placement of the cross member in place between uprights to be joined thereby, and an extended position for engagement of the hook in a slot of the upright. The hook has an extension projecting inwardly along the cross member and shaped to form an abutment disposed inwardly of the hook, as is provided, for example, by pocket 5. Vertically movable wedges are secured in an unremovable manner to the cross member for wedging against the abutment to secure the hooks in place in the slots of the upright.

The cross member may further comprise a second abutment, such as the inclined ramp member 7, which is mounted on the cross member in a stationery condition outwardly of the abutment of the hook, whereby a pocket for the wedge between the hook abutment and the stationery abutment is provided. The abutments have at least one ramp surface for cooperation with the taper of the wedge for the wedging thereby.

For the mounting of the wedge on the cross member, the wedge can have a slot which extends in the vertical direction, and a pin can be mounted on the hook extension, extending through the slot and securing the wedge to the extension in an unremovable manner, and so that the wedge can be moved in the vertical direction on the hook extension.

Desirably, as is depicted in FIG. 5, means can define a slot in the cross member for receiving an auxiliary wedge, such as the auxiliary wedge 12 in FIG. 5, which when inserted in the cross member slot can urge the hook to the extended position by working against the inwardly disposed side of the hook abutment. Advantageously, the cross member slot is disposed in the lower side of the cross member and a slot is provided in the upper side of the cross member, aligned with the lower slot so that the auxiliary wedge can be inserted through the bottom slot and when urging the hook to the extended position, projects through and above the upper slot. Thereby, removal of the auxiliary wedge is facilitated.

The unremovable mounting of the hook on the cross member can be provided by interference between the wedge and the second abutment 7 when the hook is fully extended, so that the extent to which the hook member can be moved outwardly, is limited. As to limiting inward movement, there can be interference between the wedge and a portion of the cross member when the hook assembly is loose on the cross member, and not engaged in a slot. Such construction is indicated in FIG. 1.

Vertical movement of the hook member within the cross member, can be limited by providing the cross member with inturned lips at the bottom and top thereof.

What is claimed is:

1. Cross member having end hooks for a scaffold assembly formed by a plurality of said cross members and uprights having slots in which the hooks engage to join the cross members and uprights together, and having wedges securing the cross members and uprights in place, the improvement which comprises the cross member having a hook which is secured to the cross member in an unremovable manner and so that it is longitudinally shiftable on the cross member between a retracted position permitting placement of the cross member in place between uprights to be joined thereby and an extended position for engagement of the hook in a slot of the upright, the hook having an extension projecting inwardly along the cross member and shaped to form an abutment disposed inwardly of the hook, and a vertically movable wedge secured in an unremovable manner to the hook extension for wedging against the abutment to secure the hook in place in the slot of the upright and a second abutment which is mounted on the cross member in stationary condition outwardly of the abutment of the hook for providing a pocket for the wedge between the hook abutment and the stationary abutment the unremovable mounting of the hook on the cross member being provided by interference between the wedge and the second abutment when the hook is fully extended, and interference between the wedge and a portion of the cross member when the hook is fully retracted.

2. Cross member according to claim 1, the abutments having a ramp surface for cooperation with the taper of the wedge for the wedging thereby.

3. Cross member according to claim 1, the wedge having a slot which extends in the vertical direction, a pin mounted on said hook extension through the slot, the pin securing the wedge to the extension in said unremovable manner and so that the wedge can be moved in the vertical direction on the hook extension.

4. Cross member according to claim 3, the wedge having an aperture adjacent the wider end thereof positioned so that the aperture is partially above the upper edge of the cross member with the wedge securing the hook in a slot of the upright, whereby a wedge loosening tool can be inserted in the aperture for disassembly of the scaffold.

5. Cross member according to claim 1, the wedge having an aperture adjacent the wider end thereof positioned so that the aperture is partially above the upper edge of the cross member with the wedge securing the hook in a slot of the upright, whereby a wedge loosening tool can be inserted in the aperture for disassembly of the scaffold.

6. Cross member according to claim 1, means defining a slot in the cross member for receiving an auxiliary wedge which when inserted in the cross member slot can urge the hook to the extended position by working against the inwardly disposed side of the hook abutment.

7. Cross member according to claim 6, said cross member slot being disposed in the lower side of the cross member and a slot in the upper side of the cross member aligned with the lower slot so that the auxiliary wedge can be inserted through the bottom slot and when urging the hook to the extended position can project through and above the upper slot.

* * * * *